United States Patent [19]

Blackwelder et al.

[11] Patent Number: 5,861,201
[45] Date of Patent: Jan. 19, 1999

[54] MULTILAYER LABEL MATERIAL

[75] Inventors: Maurice W. Blackwelder; Louis M. DiBello, both of Bardstown, Ky.

[73] Assignee: Owens-Illinois Labels Inc., Toledo, Ohio

[21] Appl. No.: 977,248

[22] Filed: Nov. 24, 1997

Related U.S. Application Data

[63] Continuation of Ser. No. 695,096, Aug. 7, 1996, abandoned, which is a continuation-in-part of Ser. No. 496,725, Jun. 29, 1995, abandoned, which is a continuation of Ser. No. 196,724, Feb. 15, 1994, abandoned.

[51] Int. Cl.$^6$ ...................................................... B29C 47/06
[52] U.S. Cl. .................... 428/36.91; 428/34.1; 428/34.9; 428/35.7; 428/156; 428/158; 428/159; 428/170
[58] Field of Search .................................. 428/34.1, 34.9, 428/35.7, 36.91, 156, 158, 159, 170

[56] References Cited

U.S. PATENT DOCUMENTS

| | | |
|---|---|---|
| Re. 32,929 | 5/1989 | Ewing . |
| 3,619,344 | 11/1971 | Wolinski . |
| 3,861,994 | 1/1975 | Stark . |
| 3,955,020 | 5/1976 | Cavanagh et al. ........................ 428/210 |
| 3,988,521 | 10/1976 | Fumel et al. . |
| 3,993,810 | 11/1976 | Bonis . |
| 3,994,764 | 11/1976 | Wolinski . |
| 4,007,246 | 2/1977 | Bailey . |
| 4,011,357 | 3/1977 | Haase . |
| 4,016,327 | 4/1977 | Fumei et al. . |
| 4,036,675 | 7/1977 | Amberg et al. . |
| 4,049,147 | 9/1977 | Stiles et al. . |
| 4,062,712 | 12/1977 | Stark . |
| 4,069,934 | 1/1978 | Karabedian . |
| 4,101,050 | 7/1978 | Buckler et al. . |
| 4,133,930 | 1/1979 | Wright et al. . |
| 4,184,005 | 1/1980 | Bauriedel et al. . |
| 4,190,168 | 2/1980 | Jacques . |
| 4,228,600 | 10/1980 | Krug et al. . |
| 4,262,052 | 4/1981 | Kannan et al. . |
| 4,264,657 | 4/1981 | Tollette . |
| 4,281,040 | 7/1981 | Santiago . |
| 4,292,355 | 9/1981 | Bonis . |
| 4,370,369 | 1/1983 | Bonis . |
| 4,370,374 | 1/1983 | Raabe et al. . |
| 4,410,595 | 10/1983 | Matsumoto et al. . |
| 4,426,065 | 1/1984 | Komatsuzaki et al. . |
| 4,440,824 | 4/1984 | Bonis . |
| 4,444,839 | 4/1984 | Dudzik et al. . |
| 4,452,835 | 6/1984 | Vasudevan . |
| 4,463,861 | 8/1984 | Tsubone et al. . |
| 4,469,741 | 9/1984 | Akao . |
| 4,528,221 | 7/1985 | Komatsuzaki et al. . |
| 4,533,578 | 8/1985 | Boyd et al. . |
| 4,581,262 | 4/1986 | Karabedian . |
| 4,585,679 | 4/1986 | Karabedian . |
| 4,601,926 | 7/1986 | Jabarin et al. . |
| 4,608,284 | 8/1986 | Roales . |
| 4,657,811 | 4/1987 | Boyd et al. . |
| 4,661,401 | 4/1987 | Akao . |
| 4,673,611 | 6/1987 | Crass et al. . |
| 4,687,534 | 8/1987 | Alford et al. . |
| 4,707,396 | 11/1987 | Wank et al. . |
| 4,724,176 | 2/1988 | Sun . |
| 4,756,785 | 7/1988 | Konig et al. . |
| 4,758,462 | 7/1988 | Park et al. . |
| 4,837,956 | 6/1989 | Dolence . |
| 4,879,147 | 11/1989 | Newman et al. . |
| 4,911,978 | 3/1990 | Tsubone et al. . |
| 4,966,805 | 10/1990 | Ezawa et al. ............................ 428/212 |
| 4,975,313 | 12/1990 | Ezawa et al. . |
| 5,019,439 | 5/1991 | Momose . |
| 5,028,480 | 7/1991 | Dean . |
| 5,055,345 | 10/1991 | Wank et al. . |
| 5,065,862 | 11/1991 | Mousseau et al. . |
| 5,079,057 | 1/1992 | Heider . |
| 5,082,608 | 1/1992 | Karabedian et al. .................. 264/46.1 |
| 5,106,677 | 4/1992 | Yeh et al. . |
| 5,128,196 | 7/1992 | Luetkens, Jr. et al. . |
| 5,151,309 | 9/1992 | Dollinger ................................. 428/40 |

FOREIGN PATENT DOCUMENTS

| | | |
|---|---|---|
| 0498249 | 8/1992 | European Pat. Off. . |
| 2160818 | 1/1946 | United Kingdom . |
| 1189362 | 1/1990 | United Kingdom . |

*Primary Examiner*—Cecilia J. Tsang
*Assistant Examiner*—Patrick R. Delaney

[57] ABSTRACT

A coextruded label material is provided which comprises a styrenic unfoamed layer and a styrenic foam layer wherein the styrenic unfoamed layer is the predominant portion as contrasted to the styrenic foam layer. In accordance with another aspect of the invention, an additional clear or translucent unfoamed plastic layer is adhered to the unfoamed layer with printing interposed between the unfoamed layers. Printing is provided on the unfoamed layer of the coextruded material or other side of the additional clear or translucent unfoamed layer. A container package is provided wherein a label is cut from the label material and wrapped about a hollow container.

83 Claims, 4 Drawing Sheets

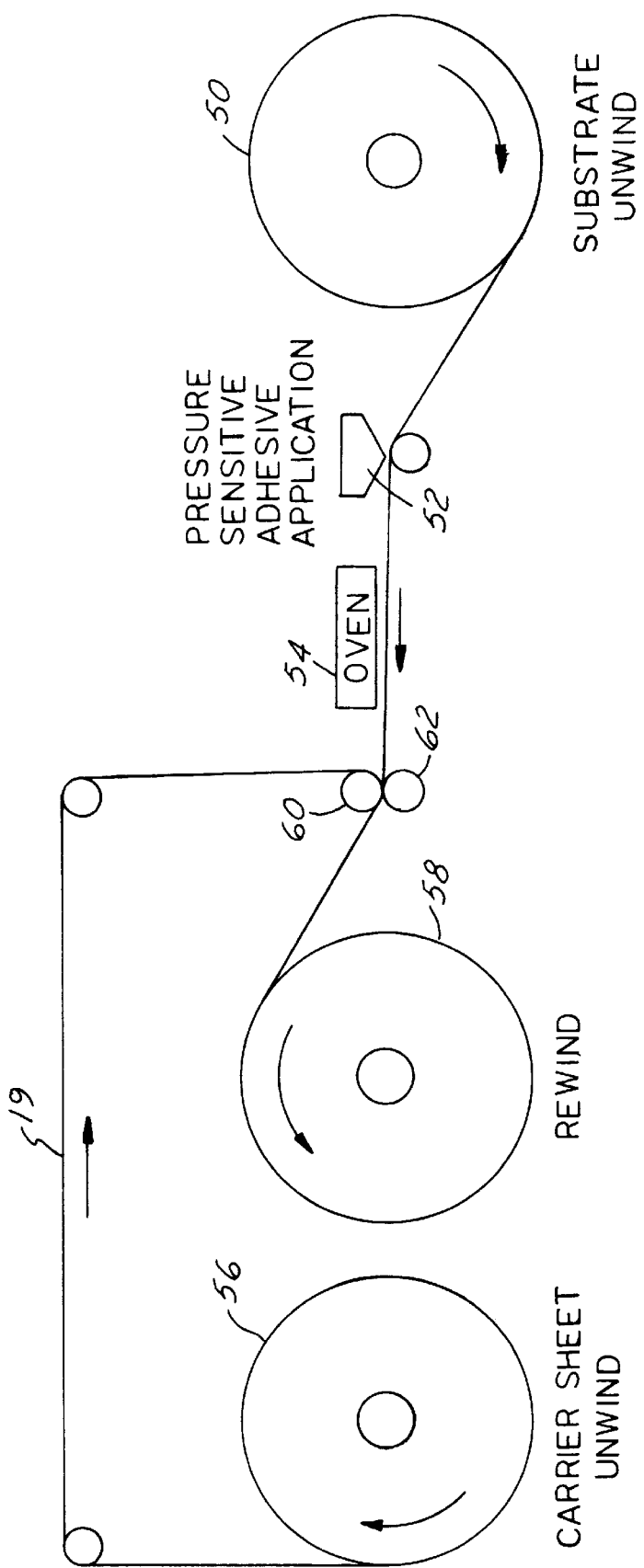

MULTILAYER LABEL MATERIAL

This application is a continuation of application Ser. No. 08/695,096 filed Aug. 7, 1996, now abandoned which is a continuation-in-part of patent application Ser. No. 08/496,725, filed Jun. 29, 1995 now abandoned, which is a continuation of Ser. No. 08/196,724 filed Feb. 15, 1994 now abandoned.

This invention relates to multilayer label material suitable for printing and decoration which can be applied to glass, plastic and metal containers and to a package comprising a label made from such material and a hollow container.

BACKGROUND AND SUMMARY OF INVENTION

Coextrusion of a two-layer polystyrene structure having a foam layer and a solid unfoamed layer has been a common commercial operation for many years. These processes employ an annular die where the extrudate is drawn as a sleeve or tube out over a mandrel on which the material is cooled, sized in width and formed into a sheet. However, in all such cases, the unfoamed layer has to be kept relatively thin (0.5–0.75 mils) and the foam layer kept relatively thick (general minimum around 4.0 mils). In other words, the foam layer has been the predominate portion of the total thickness and the unfoamed layer the minor portion of the total thickness. This type of structure lacks in durability due to the predominate portion being foam, and is sensitive to tearing and chipping especially when conveying, accumulating and boxing filled labeled containers for commercial use. Accordingly, it has been used as labels in environments where the label does not require durability.

Attempts have been made to make the unfoamed layer thicker while maintaining the foamed layer at the same thickness but this has resulted in an unsuitable structure due to brittleness and roughness.

Attempts have been made to add resin additives to the unfoamed layer in order to toughen the structure but this has proved of little benefit because the foamed layer, being the thicker, results in the structure lacking the durability as described above.

Attempts have been made to use thin unfoamed polystyrene films of 5 mils or less for label material. Such material has a density of 64–65 PCF and is unsuitable for use in the recycling of the PET plastic bottles. In addition, rolls of thin film material less than 5 mils have gauge bands and are uneven in hardness across the width of the roll which creates problems in subsequent processing such as printing and cutting into labels.

Attempts have been made to use a single thin unfoamed plastic film such as polypropylene or polyethylene. However, such a label material has disadvantages among which is the tendency of the thin film, having a thickness of less than 5 mils, to have gauge bands. When such a material is extruded and wound in a roll, the rolls tend to deviate from a cylinder and are uneven in hardness across the width of the roll. In addition, the thin film lacks stiffness and cannot be readily handled in the subsequent processing such as printing and cutting into labels.

Thin films (3.0 mils or less) made from polystyrene with any functional utility for label stock with a density less than 64 PCF (the natural density of polystyrene) have previously not been possible to make; again due to the brittle nature of blown expanded polystyrene.

Among the objectives of the present invention are to provide a label material which can be printed and decorated which has greater durability and is less sensitive to tearing and chipping during handling. Among the further objectives are to provide a plastic substrate which can be used as a label material or as a substrate by laminating another unfoamed plastic layer thereon by adhesive or by extrusion coating; wherein the presence of gauge bands is minimized; wherein the label material can be wound in rolls that can be readily handled without the adverse effects of gauge bands due to the unfoamed plastic layer or due to ink printing thereon; wherein the labels have a thin layer of foam material which provides cells that define an irregular surface which is receptive to adhesive for adhering the label to a container such as a glass bottle, plastic bottle or can; wherein a minimal amount of adhesive is required to adhere the label; wherein if the label is not applied correctly, the label can be readily removed from the container and a minimal portion of the label is left on the container such that the container can be re-labeled; wherein when the container with the label is recycled, the density of the label is below that of water such that the label can be readily reclaimed separate from the container; wherein the label has greater stiffness than a thin unfoamed layer; and wherein when the label material is to be used as a pressure sensitive layer and is applied to a carrier web for handling, the label and carrier web provide sufficient insulation to withstand the heat of laser printing as is sometimes used in the field as, for example, in labeling pressure sensitive labels used on store shelves.

In accordance with the invention, an extruded thermoplastic thin sheet material is produced that is suitable for use as labeling stock to be applied to glass or plastic containers. Requirements of such labeling stock are surface smoothness to provide a high quality printing surface, toughness to resist chipping and tearing in commercial high speed conveying and packaging of filled bottles, and waterproofness for durability in consumer use. An additional preferred attribute of the label stock is that of a thin overall thickness or caliper (1.5–3.0 mils) whereby the number of labels on a roll can be greater than with a thicker caliper so that in use the number of roll changes necessary in a high speed labeling operation are reduced.

In accordance with one aspect of the present invention, a coextruded label material is provided in a substrate which comprises a styrenic unfoamed layer and a styrenic foam layer wherein the styrenic unfoamed layer is the predominant portion as contrasted to the styrenic foam layer. In accordance with another aspect of the invention, an additional clear or translucent unfoamed plastic layer is adhered to the unfoamed layer with printing interposed between the unfoamed layers. Printing is provided on the unfoamed layer of the coextruded material or other side of the additional clear or transparent unfoamed layer if applied by lamination.

In accordance with another aspect of the invention, labels from a coextruded substrate are provided with a pressure sensitive adhesive on the thin foam layer and the labels are, in turn, adhered by the pressure sensitive adhesive onto a carrier for handling the label.

DESCRIPTION OF THE DRAWINGS

FIG. 8 is a diagrammatic view of a method and apparatus forming the label material shown in FIG. 7.

DETAILED DESCRIPTION OF THE PREFERRED EMBODIMENT

In accordance with one aspect of the present invention, a label material is provided which comprises a styrenic unfoamed layer and a styrenic foam layer wherein the unfoamed plastic layer is the predominant portion as contrasted to the foam plastic layer.

In accordance with another aspect of the invention, an additional clear or translucent unfoamed plastic layer is adhered to the unfoamed plastic layer with printing interposed between the unfoamed plastic layers. Printing is provided on the unfoamed layer of the coextruded material or other side of the additional clear or transparent unfoamed layer if applied by lamination.

In accordance with another aspect of the invention, labels from a coextruded substrate are provided with a pressure sensitive adhesive on the thin layer and the labels are, in turn, adhered by the pressure sensitive adhesive onto a carrier sheet for handling the label.

Figure 1:
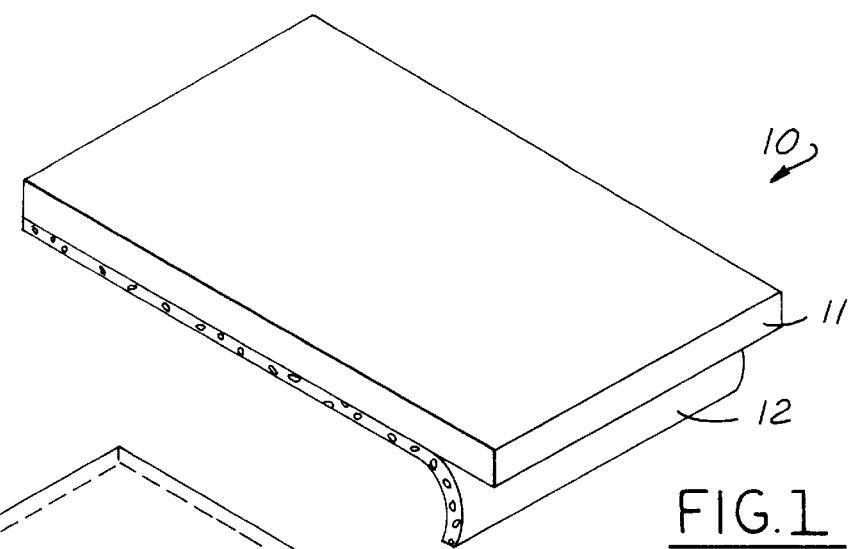
FIG. 1 is a diagrammatic perspective view of a coextruded label material or substrate embodying the invention.

Referring to FIG. 1, a coextruded plastic label material or substrate 10 embodying the invention consists of a proportionally thicker unfoamed preferably opaque layer of styrenic plastic material 11 and a thinner foam layer 12 of styrenic plastic material. The unfoamed layer preferably includes a pigment that is opaque.

The thicker unfoamed layer 11 preferably has a thickness ranging between about 1.0 mils to about 2.50 mils. For optimum properties including strength and opacity, the preferred thickness range for the unfoamed material is between about 1.25 mils to about 1.30 mils.

The foam layer 12 preferably has a thickness ranging between about 0.25 mils and about 1.0 mils.

The total thickness of the coextruded styrenic substrate 10 preferably ranges between about 1.5 mils and about 3.0 mils. For optimum properties, the total thickness ranges between about 1.8 mils to about 2.0 mils. When the total thickness is less than about 1.8 mils, opacity and tear strength are reduced. When the total thickness is greater than 2.0 mils, the number of labels per roll will be reduced and the labels will require more plastic.

The preferred density of the thin foam layer ranges between about 20 and about 24 lbs/ft$^3$.

As used herein, styrenic plastic material comprises polystyrene and copolymers of polystyrene.

A preferred form of the coextruded styrenic label material comprises a high impact polystyrene in the unfoamed layer 11, preferably including a pigment in a fusion blend to make the unfoamed layer 11 opaque. A satisfactory pigment is $TiO_2$. Styrenic type polymers are preferred for use in the substrate sheet instead of polyolefinic polymers due to their greater stiffness properties but particularly due to their improved cutting properties. The cutting of the labels during application at high speeds (400–500 bottles per minute) is often a significant problem with polyolefin type substrates requiring down-time to resharpen or replace knives. For the desired toughness and elongation, the styrene resin should therefore be a high impact polystyrene or styrene-butadiene copolymer type.

Satisfactory caliper and density of the styrenic foam layer have been achieved where the thin foam layer comprises medium impact polystyrene.

Satisfactory results have also been achieved where the styrenic foam layer 12 comprises a fusion blend of medium impact polystyrene, polypropylene, and a compatability agent such as a block styrene copolymer, as disclosed in U.S. Pat. No. 4,462,455, incorporated herein by reference.

The method of coextrusion preferably utilized is that disclosed in U.S. Pat. No. 5,082,608 utilizing $CO_2$. The amount of carbon dioxide ($CO_2$) usage for the foam layer described is in the range of 0.15% to 0.20% of the foam layer by weight. The carbon dioxide is generated by the addition of sodium bicarbonate and citric acid.

For the solid layer, a high impact grade of polystyrene is preferably used with a rubber content within the range of 7–9% and a melt flow (Condition G) between 2.5–4.0 and having a tensile elongation in the range of 40–60%. Commercial high impact grades of this type include Novacor 2312, Fina 825E, Dow 498 and Chevron 9400. To achieve a white opaque appearance, a concentrate made up of 60% titanium dioxide and 40% polystyrene (preferably an impact grade) is added at the rate of 12–15% to achieve a final opacity generally in the range of 72–75. Added toughness of the solid layer may be achieved by substituting 10–30% of an ethylene-methyl acrylate copolymer such as Chevron SP2260 or an advanced styrenic (styrene-butadiene copolymer) such as Dow Aim 4800 or a styrene-butadiene block copolymer such as Phillips K-Resin KR05 for an equivalent portion of the impact polystyrene.

The defined thin cellular layer may be formulated with 85–90% medium impact polystyrene, 5–15% polypropylene copolymer, 1–5% styrene-butadiene block copolymer and 1–3% endothermic chemical agent. The medium impact polystyrene should have a rubber content of 2–5% with a melt flow (Condition G) between 6–10 as illustrated by commercial grades such as Chevron 7034 or Novacor 410. The propylene-ethylene copolymer used have typically a melt flow rate (Condition L) between 4–8 with an ethylene content of 3–6% as illustrated by commercial grades such as Himont 7723, Shell WRS6-217, and Exxon 9012. The block styrene copolymer serves as a compatibilizer for the polystyrene and the polypropylene. Thermoplastic rubbers found useful for the purpose are the saturated mid-block Kraton G series from Shell Chemical Co. The endothermic chemical agent is a commercially supplied mixture of sodium bicarbonate and citric acid in a polystyrene carrier. Such materials include Epicor 7535 from EPI Inc. and Hydrocerol CF40 from B.I. Chemicals, Inc.

The polypropylene serves several purposes. It reduces the adhesion of the defined cellular layer to the solid layer to prevent the defined cellular layer from reducing the toughness of the solid layer. It helps to achieve a lower density with use of less chemical agent. Also, it helps to produce a softer more delicate membrane structure in the defined cellular layer, which helps maintain the strength of the solid layer and provides a cushioning effect in winding the rolls to minimize gauge bands.

The method thusly described produces a thin film polystyrene sheet with a smooth surface suitable for high quality printing and yet has a toughness quality exceeding prior conventional coextruded thick foam/thin unfoamed structured label material. The application of the defined cellular layer reduces the sheet density well below that of water to be suitable to function in the process to reclaim and recycle the plastic from the containers after use. The ability to combine this defined celluar layer with the solid layer without loss in strength properties makes this sheet unique to others produced in the industry.

Examples of the coextruded substrate herein described with physical properties are listed below:

TABLE I

| Property | Units | Sample 1 | Sample 2 | Sample 3 | Sample 4 |
|---|---|---|---|---|---|
| Composite Caliper | Mils | 2.00 | 1.80 | 1.65 | 1.57 |
| Solid Layer Caliper | Mils | 1.30 | 1.15 | 1.00 | 1.00 |
| Cellular Layer Caliper | Mils | 0.70 | 0.65 | 0.65 | 0.57 |
| Composite Density | PCF | 50 | 50 | 48.5 | 44.6 |
| Solid Layer Density | PCF | 67.6 | 67.3 | 67.1 | 67.3 |
| Cellular Layer Density | PCF | 19.0 | 19.5 | 19.4 | 18.8 |
| Tensile Yield | Lbs. | 5.6 | 5.1 | 4.6 | 4.6 |
| Tensile Break | Lbs. | 5.3 | 5.0 | 4.5 | 4.2 |
| Elongation | % | 47.2 | 41.0 | 45.0 | 37.3 |
| Mullen Burst Strength | PSI | 19.4 | 17.9 | 15.6 | 14.1 |
| Tear Strength | Lbs. | 5.0 | 4.7 | 4.4 | 3.3 |
| MD Stiffness | Mgs. | 7.0 | 5.7 | 3.9 | 2.6 |
| CD Stiffness | Mgs. | 3.7 | 3.5 | 2.2 | 1.6 |

For preferred characteristics in shrinkage applications of the styrenic label substrate, the sheet should have greater machine direction orientation than cross direction orientation. Typical values of shrinkage observed when a sample is subjected to heat are:

| TEMPERATURE (F.) | % MD SHRINKAGE | % CD SHRINKAGE |
|---|---|---|
| 210 | 25.0 | 0.5 |
| 220 | 45.0 | 6.0 |
| 230 | 60.0 | 12.0 |

The thin foam layer is primarily a cushioning backing and a minor component of the structure. While the preferred cell size is in the range of 0.015–0.050 sq. mm, satisfactory results have been produced in the range of 0.050–0.090 sq. mm.

Figure 2:
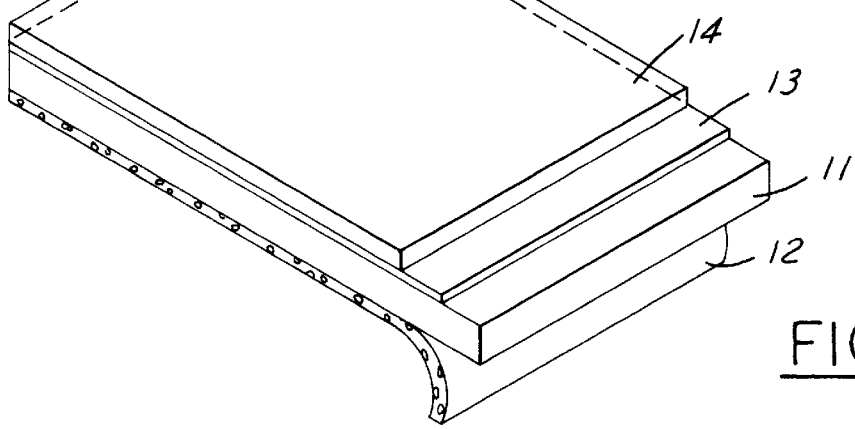
FIG. 2 is a diagrammatic perspective view of a modified form of label material.

In a printed form of the label material shown in FIG. 2, printing 13 is applied to the unfoamed thick layer 11 and a protective varnish overcoat layer 14 is provided over the printing.

Figure 3:
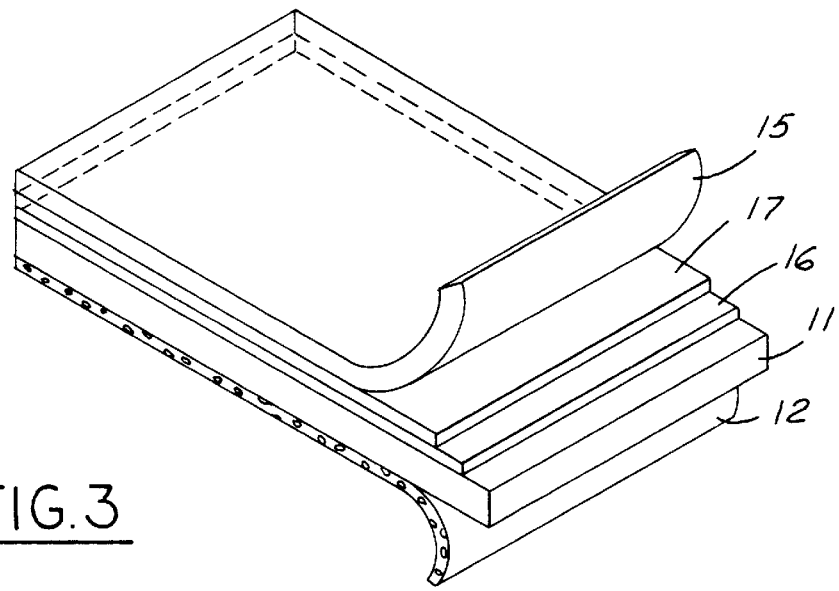
FIG. 3 is a diagrammatic perspective view of a further modified form of label material.

In another preferred form of the invention shown in FIG. 3, unfoamed clear or translucent layer 15 of plastic material is laminated to the unfoamed thick layer 11 after printing 16 is applied to the thick unfoamed layer 11. The unfoamed layer 15 is adhered to the thick unfoamed layer 11 by an adhesive layer 17.

The additional unfoamed layer 15 may vary in thickness but preferably ranges in thickness between about 0.4 mils and 1.0 mils. The additional unfoamed layer preferably comprises biaxially oriented polypropylene. The additional layer may also comprise any thermoplastic material such as polyethylene or polystyrene. Where a shrinkable label is desired, the unfoamed additional layer comprises polystyrene having a matched machine direction orientation in the same direction as the coextruded polystyrene substrate.

Figure 4:
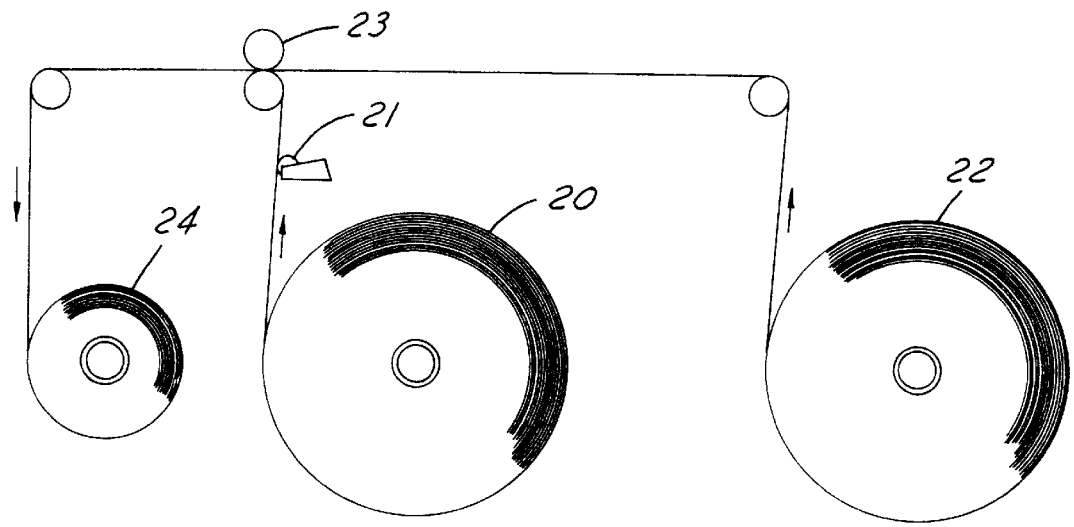
FIG. 4 is a diagrammatic view of a method and apparatus for laminating an unfoamed layer to the coextruded label material.

A satisfactory adhesive to make the laminate is a solventless (often also called 100% solids), two component reactive polyurethane adhesive. Consequently, no drying oven is required. As shown in FIG. 4, adhesive is applied to the printed substrate from roll 20 by an applicator 21 and joined with the polypropylene film from roll 22 at nip rollers 23. The two adhesive components undergo a chemical reaction (cross linking) when combined which "cures" the adhesive to a solid state without release of volatiles. The laminate is then wound on a roll 24. Acceptable adhesive components include Morton International's Mor-Free 216 and Morton Coreactant C-81 made by Morton International Inc., Chicago, Ill.; and TYCEL 7975 and coreactant 7276 made by Liofol Company, Cary, N.C.

It has been found that the label material embodying the invention has high durability, is less sensitive to tearing and chipping during handling and provides for a greater number of labels per roll resulting in a substantially reduced frequency of changing rolls in high speed labeling operations.

In the preferred mode of use, labels are cut from a roll of the laminate and wrapped about plastic or glass containers with the ends of the labels bonded to one another. Where the additional layer is polypropylene, a hot melt adhesive is satisfactory. Where the additional layer is styrenic, bonding may be by heat bonding, hot melt adhesive or solvent.

In another mode of use, labels are cut from a roll of coextruded substrate, wrapped on a container and the ends of each label are bonded to one another. The label is then shrunk on the container by moving through an oven as shown in U.S. Pat. No. 4,626,455, incorporated herein by reference.

With respect to durability and toughness, the two major requirements for label stock on plastic containers such as PET are resistance to tearing and the ability to stretch. In typical tests, filled labeled plastic bottles made of polyethylene terphthalate (PET) were conveyed, accumulated in groups and dropped (literally) into boxes or crates for distribution. The top and bottom edges of the label were thereafter exposed to potential scraping surfaces which can tear the labels. The chart below indicates measured tear resistance values along with Mullen burst strength which is also a measure of toughness.

| | Tear Strength (lbs.) | Mullen Burst (PSI) |
|---|---|---|
| Three layer regular foam type material (5 mils)* | 1.5–2.5 | 15 |
| Unlaminated two layer substrate | 3.0–4.5 | 20 |
| PP laminated two layer substrate | 9.0–12.0 | 45 |

*A prior existing three layer styrenic coextruded foam material consisting of a thick foam layer coextruded with a thin non-foam layer on each opposite side of the foam layer.

Soda beverage bottles were filled at a cold temperature (around 40° F.) and then wrapped with a label. As the bottle warms to room temperature or above, the gas in the carbonated beverage is progressively released and increases the bottle diameter which requires the label to stretch accordingly. Comparative elongation values for different materials are shown below:

| | % Elongation |
|---|---|
| Three layer regular foam type material* | 10 |
| Unlaminated two layer substrate | 35 |
| PP laminated two layer substrate | 45 |

*A prior existing three layer styrenic coextruded foam material consisting of a thick foam layer coextruded with a thin non-foam layer on each opposite side of the foam layer.

A common problem in producing thin gauge sheet materials is that even minor caliper variations in the cross direction of the sheet produce severe gauge bands which create permanent wavy distortions in the sheet and the rolls generated have severe soft and hard areas without continuous horizontal surface and often not remaining level on an even surface. Thin caliper material has more footage in a roll at any given roll diameter compared to thicker gauge materials which means that these gauge variations are multiplied many more times over per roll.

Roll quality is significantly affected by gauge bands with thin gauge material due to the increase in roll footage or number of wraps or plies of material around the roll compared to thicker gauge materials. In other words, any caliper variation is multiplied many more times with thin caliper material as it is repeatedly wound around the roll due to added web length. Using a 24 inch diameter roll for an example (with a 6 inch core), the footage of material in the roll at a few selected calipers is illustrated in the following chart.

| NOMINAL CALIPER (MILS) | ROLL FOOTAGE |
|---|---|
| 1.65 | 21,040 |
| 2.00 | 17,365 |
| 4.00 | 8,680 |
| 6.00 | 5,785 |

As can be seen, the footage of 1.65 mil material is almost four times more than the material at 6.0 mils. If cross directional gauge (caliper) variation of only plus and minus 0.05 mils is considered around the nominal values shown in the above chart and the cross directional gauge variation was continuous throughout the roll, the resultant roll diameter at the location of those caliper values can then be calculated.

| CALIPER* | ROLL** DIAMETER | CALIPER | ROLL DIAMETER | CALIPER | ROLL DIAMETER | CALIPER | ROLL DIAMETER |
|---|---|---|---|---|---|---|---|
| 1.60 | 23.66 | 1.95 | 23.73 | 3.95 | 23.86 | 5.95 | 23.91 |
| 1.70 | 24.33 | 2.05 | 24.28 | 4.05 | 24.14 | 6.05 | 24.09 |
| DIFFERENCE | 0.67 | | 0.55 | | 0.28 | | 0.18 |

*CALIPER IN MILS
**ROLL DIAMETER IN INCHES

The above chart therefore demonstrates that material made at a nominal caliper of 1.65 mils with a plus and minus 0.05 mil variation could theoretically have a gauge band (hill and valley effect) of 0.67 inches, whereas, material at 6.00 mils at the same cross directional variation would have only a difference of 0.18 inches.

The addition of the thin foam layer is not considered to improve the cross directional caliper variation as extruded. Its function in improving the roll quality with less gauge band effect is due to its compressive nature whereby the thicker areas are compressed with conceivably a pushing of the material toward adjacent lower areas. Due to the thin nature of this thin foam layer, its mechanism for significantly improving the roll quality may not be fully defined. Its benefits are, however, dramatic. Material extruded from a stationary annular die of thin caliper (such as 3 mil or less) has at times generated rolls which have been literally oval on one side and round on the other side. It has then been demonstrated that by simply adding the thin foam layer without further adjustment, the rolls then produced would be consistent side to side nearly equal in hardness across the roll face. This in effect changed a totally unacceptable situation into a viable commercial process.

The preferred plastic resin types for the labeling material are rubber modified impact polystyrene or styrene-butadiene copolymers. Such materials are economical compared to many other plastic resins and provide a greater stiffness compared to olefinic type resins.

In making the coextruded substrate, a stationary annular die is preferred over a stationary flat die due to the enhancement of cross directional orientational properties achieved by use of the annular die if the label is used as a shrinkable label. While the machine directional orientation is preferred to be greater than the cross directional orientation, insufficient cross directional orientation will make the sheet sensitive to breaking when folded along the machine directional axis. Labels produced from such material could hence fail to perform as required in application.

The present invention may be contrasted to label stock currently being produced from foam (expanded) polystyrene and foam polystyrene coextruded to have a thin layer of unfoamed polystyrene on one or both surfaces. This unfoamed surface improves the smoothness of the sheet to enhance printing quality but the surface smoothness may still be deficient for many applications and more stringent customer requirements. Such material may also be deficient in toughness according to present standards due to the increases in labeling speeds and finished product packaging, handling and transporting requirements.

In accordance with the invention, the solution to the referenced problems was found whereby a stationary annular coextrusion die was utilized to produce a thermoplastic sheet material, essentially film-like in nature consisting of two layers. A rotary annular die may also be used. The predominate unfoamed layer consists of a rubber modified high impact polystyrene or styrene-butadiene copolymer to which titanium dioxide is added to provide a white opaque appearance. This predominate layer represents 75–85% by weight of the total structure and hence provides the strength with surface smoothness essential for the label requirements.

The coextruded substrate comprises a predominate unfoamed styrenic layer 11 and a backing which is a thin foam layer 12 which represents about 15–25% by weight of the total structure. The foam layer 12 has a compressive nature which functions during the winding of the roll resulting in compression in thick caliper areas. In addition, there may be some expansion in thickness of the cellular skin layer in the low caliper areas. Such expansion is believed to occur since the cellular structure is preferably blown by using carbon dioxide gas which leaves the cells immediately upon exit from the extrusion die. Due to the low pressure within the cells, created by the sudden loss of carbon dioxide gas through cell walls, air migrates into the cells to create some expansion if unrestricted by tension pressure of winding the roll such as occurs in thinner caliper areas.

In addition to the contributions the thin foam layer makes in minimizing web distortions, which would otherwise result from gauge bands, the thin foam layer has other benefits. The tiny cells (bubbles) comprising its structure form a textured somewhat irregular surface pattern more receptive than a smooth surface to the application of hot melt adhesives as used to attach the label to the bottle. The thin foam layer also has some surface cells that have expanded excessively to break and form tiny cavities into which a hot melt adhesive will flow and hence further improve the adhesion of the label to the container. The net effect of this improvement in adhesion due to the textured pattern and the cavities formed is that the amount of adhesive may be reduced. Since the thin foam layer is in itself a fragile structure, it delaminates (tears) from the label to remain with the hot melt adhesive on the container. Labeling machine operators associate this with fiber tear as experienced with paper and therefore can more easily adjust to the minimum amount of adhesive application.

Another advantage of the label material embodying the invention is with respect to label removal and relabeling. A label that is not correctly applied or has some form of defect such as a wrinkle or is out of register may be torn from the bottle leaving only a minor residue. This bottle may then be returned to the applicating machine for application of a fresh label.

Also, the reality of a container labeling process is that all labels are not applied perfectly. Consequently, labels must be removed (stripped) from some containers and the containers relabeled. This is where another benefit of the thin foam layer is evident. The total thickness of the thin film layer is typically between 0.5–1.0 mils. When the label is applied to a container with hot melt adhesive and then torn away from the container, the thin foam layer splits leaving a portion of the thin foam layer on the label and a portion on the adhesive layer applied to the bottle. Assuming this fragmentation left part of the foam on the label and part of the foam on the bottle, the residue on the bottle consists of soft compressible fragments less than 0.4 mils in thickness. The container can hence be relabeled with minor, if any, perceptual effects from the residue which adds to the efficiency of the labeling process.

While the material in accordance with the invention may be surface printed and a layer of varnish over-gloss applied over the printed surface and directly utilized as an economical label in many applications, its utility can be further enhanced for applications requiring more durable service. For such applications, the described high impact polystyrene unfoamed layer can be surface printed as before, but without application of a varnish over-gloss. Instead, a polyurethane type adhesive is applied to the substrate printed surface, and an additional non-foam layer of clear or transparent plastic (0.4–1.0 mil). One example is biaxially oriented polypropylene or biaxially oriented polyethylene. The additional layer then being laminated by passing the two combined layers through a suitable set of nip compression rollers. Alternatively, the clear biaxially oriented polyolefin film can be reversed printed (mirror image) such that the art work is viewed correctly and then combining the two layers by adhesive lamination through compression rollers and winding the resultant laminated structured material into roll form where the two components of the adhesive react and cure to complete the adhesive bond. Biaxially oriented polyolefin film provides more strength with higher tear and chip resistance than mono-axially oriented polyolefin film.

The addition of the layer of biaxially oriented polyolefin significantly improves the resultant label strength by making it highly resistant to tearing and chipping. Additionally, by covering the printed ink material with the protective polyolefin film, it is highly protected from scuffing as when adjacent containers rub together in transit, or chipping as when containers strike hard surfaces during product use. Also, the printed surface is protected from any chemical attack which could occur at times through the use of the container. Since the laminated polyolefin clear film provides protection for the printed matter, softer type inks can be utilized which are less expensive and yet are capable of being run at higher printing press speeds for additional economy in converting. The clear or transparent laminated film also adds sparkle and gloss with a perception of depth in the printed detail which greatly adds to the attraction of the label appearance.

Typical properties after lamination of substrate samples 1, 2 and 3 from Table I are shown in the following table:

TABLE II

| Property | Units | Substrate Sample Number | | |
|---|---|---|---|---|
| | | 1 | 2 | 3 |
| Composite Caliper | Mils | 2.50 | 2.50 | 2.35 |
| Solid Layer Caliper | Mils | 1.30 | 1.15 | 1.00 |
| Cellular Layer Caliper | Mils | 0.70 | 0.65 | 0.65 |
| BOPP Film Caliper | Mils | 0.50 | 0.70 | 0.70 |
| Composite Density | Pcf | 51.70 | 51.50 | 52.00 |
| Solid Layer Density | Pcf | 67.60 | 67.30 | 67.10 |
| Cellular Layer Density | Pcf | 19.00 | 19.50 | 19.40 |
| MD Tensile Yield | Lbs. | 6.74 | 7.20 | 6.61 |
| MD Tensile Break | Lbs. | 9.44 | 10.00 | 11.00 |
| Elongation | % | 69.80 | 58.50 | 60.80 |
| Mullen Burst Strength | Psi | 39.10 | 45.90 | 43.40 |
| Tear Strength | Lbs. | 13.00 | 15.40 | 13.90 |
| MD Stiffness | Mgs. | 17.70 | 23.00 | 21.80 |
| CD Stiffness | Mgs. | 16.30 | 21.00 | 21.60 |

As indicated above, the substrate produces a thin film polystyrene sheet with a smooth surface suitable for high quality printing and yet has a toughness quality exceeding prior conventional coextruded thin foam/thick unfoamed structured label materials which bear only slight similarity to this invention. The application of the defined cellular layer reduces the sheet density well below that of water to be suitable to function in the process to reclaim and recycle the plastic from the containers after use. The ability to combine this defined cellular layer with the solid layer without loss in strength properties makes this sheet unique to others produced in the industry.

The reduced density composite thermoplastic sheet material thusly described can be produced essentially in a preferred caliper range of 1.5 to 3.0 mils and a density range of 48–52 PCF, although the invention is not limited to these ranges. The preferred caliper range for the solid layer is 1.0–2.5 mils and for the defined cellular layer 0.25–1.00 mils. The density for the solid layer is dependent upon the amount of titanium dioxide added but typically will be in the range of 66.5 to 68.0 PCF. The preferred density for the defined cellular layer is 18–22 PCF.

The substrate composite sheet may be taken as extruded to be printed and varnish coated and converted to produce an economical label for application to a container. Such labels can be 180 degree circumferentially wrapped panel size or could be wrapped 360 degrees around the container as a sleeve with a seam overlap. Both would be bonded with an adhesive. Also, in both cases, the label would be wrapped about the container with the machine direction positioned circumferentially and the cross (transverse) direction positioned axially of the container.

Figure 5:
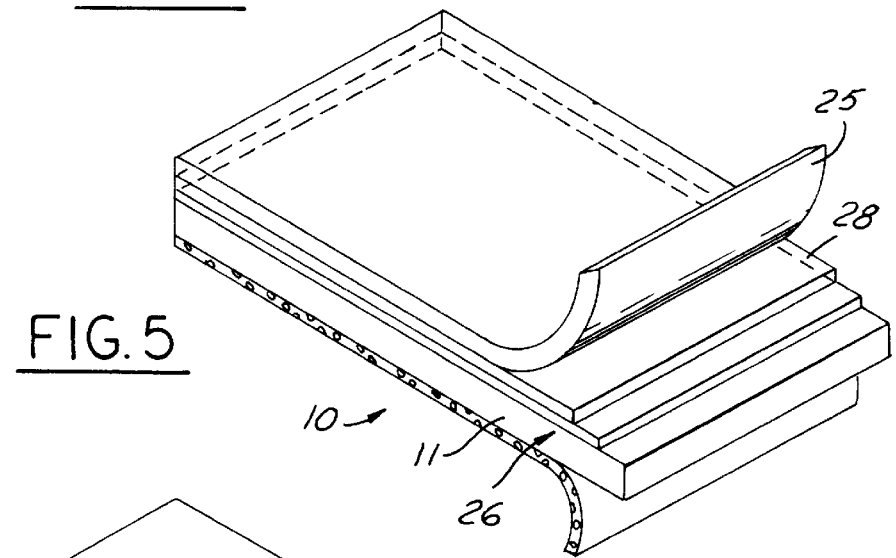
FIG. 5 is a diagrammatic view of a further modified form of label material.

As indicated above, to enhance the toughness and/or appearance of the label, the substrate or composite two-layer extruded sheet has utility for additional modifications which further illustrates its unique character. It can serve as a substrate for extrusion coating. In this application, the sheet (substrate) would be printed (without a varnish overgloss) and with suitable equipment, a thin layer (as desired in thickness, e.g. 0.25–1.50 mils of polyethylene, polypropylene or other polyolefin) can be applied over the printed surface. Referring to FIG. 5, a modified form of label material is formed by using the substrate 10 by extrusion coating a surface layer 25 on the unfoamed layer 11 which has been printed layer 26. Where the nature of the plastic material is such that there is limited adhesion, a tie layer 28 extruded or applied between the layer 25 and the unfoamed layer 11. Such construction produces a more durable, tough material resistant to tearing and chipping. The printed surface is highly protected from physical scuffing or deterioration due to chemical product exposure. Polyethylenes suitable for use include Dow Affinity SM1250 and Chevron PE-1019. Polypropylenes suitable for use include Montell X10091-32-1 and PF611.

Due to the nature of polyethylene and polypropylene, they have poor adhesion characteristics to polystyrene. In order to gain adhesion, it may be necessary in the extrusion coating process to incorporate a tie (adhesive) layer which is applied between the polystyrene printed surface and the applied polyethylene film or polypropylene film. Materials suitable for use as tie layers include Dow 2912 (ethylene acrylic acid), Union Carbide DPDA-9169 (ethylene ethyl acrylate), Quantum TR002 (ethylene methyl acrylate) and Elvax 3174 (ethylene vinyl acetate). A minimal thickness of the tie layer sufficient to achieve uniform flow and distribution from the extrusion coaster is required such as (0.1–0.2 mils). These materials have good adhesion to polystyrene, polyethylene, polypropylene and most ink binder systems.

Examples of layer materials for extrusion coated label materials are shown in the following table:

|  | Polymer | Density gms/cc | Melt Flow g/10 min. |
| --- | --- | --- | --- |
| Tie Layer Materials |  |  |  |
| Dow 2912 | EAA | 0.941 | 12.0 |
| Union Carbide DPDA-9169 | EEA | 0.931 | 20.0 |
| Quantum TR001 | EMA | 0.940 | 2.0 |
| Quantum TR002 | EMA | 0.940 | 6.0 |
| Elvax 3174 (duPont) | EVA | 0.940 | 8.0 |
| Surface Layer Materials |  |  |  |
| Dow SM1250 | PE | 0.885 | 30.0 |
| Chevron PE1019 | PE | 0.917 | 14.5 |
| Montell X10091-32-1 | PP | 0.900 | 5.5 |
| Montell PE611 | PP | 0.900 | 30.0 |

Figure 6:
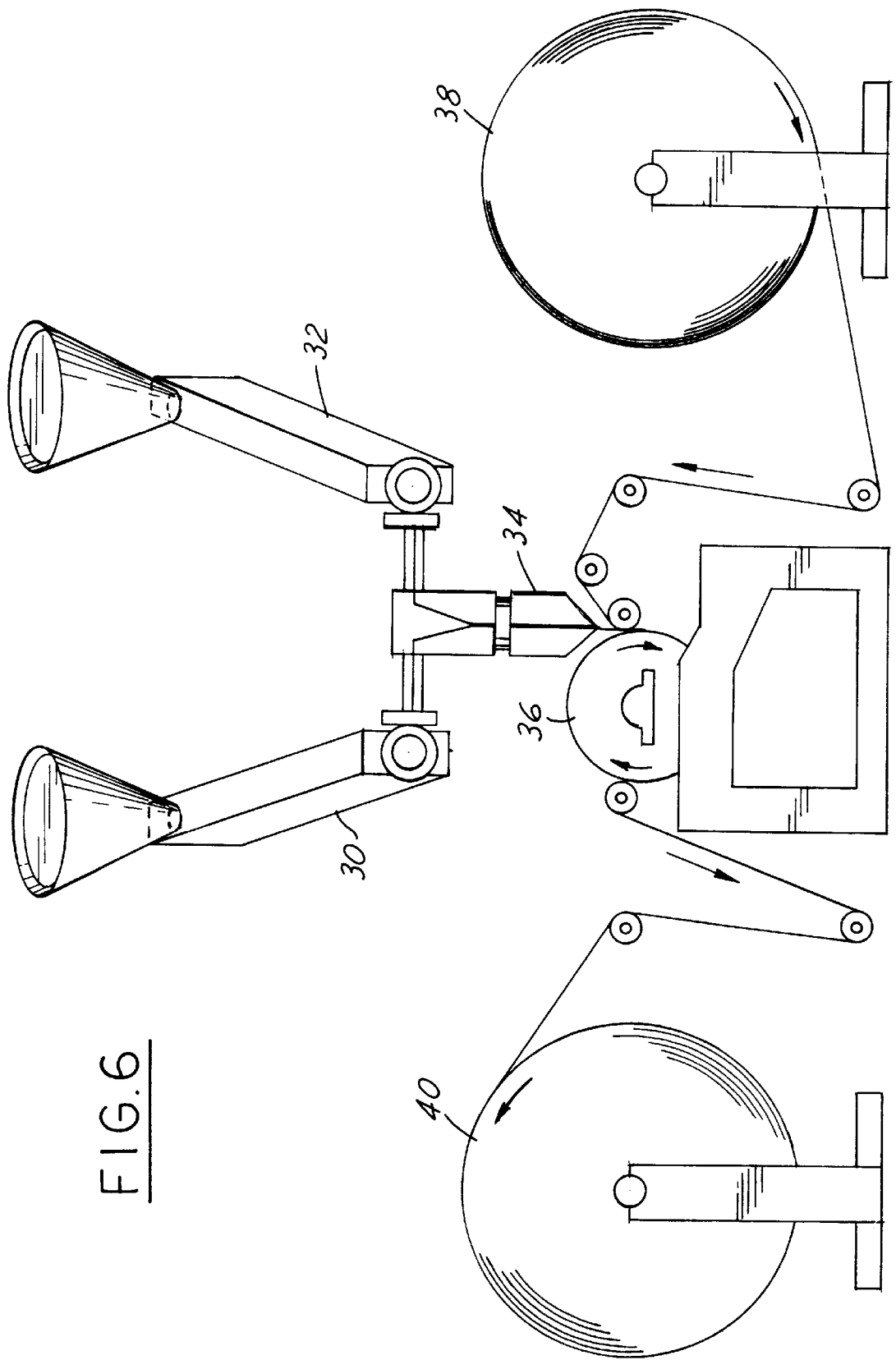
FIG. 6 is a diagrammatic view of a method and apparatus for making the label material of FIG. 5 by laminating by extrusion coating.

EAA Ethylene acrylic acid
EEA Ethylene ethyl acrylate
EMA Ethylene methyl acrylate
PE Polyethylene
PP Polypropylene
EVA Ethylene vinyl acetate Referring to FIG. 6, the extrusion coating apparatus comprises two extruders 30, 32 which feed a common coextrusion die 34 whereby a hot melt curtain of a tie layer and a surface layer is formed and flows continuously onto a web of substrate 10. Immediately after hot melt is applied, the web is passed about a highly polished smooth cooling drum 36 with the surface layer in contact with the drum 36 to cool the melt and impart a glossy smooth surface to the surface layer. The apparatus includes an unwind roll 38 for providing the web and a rewind roll 40 for rewinding the web with the coextrusion coated layers. Appropriate tension controllers, well known in the art, are provided for handling the web at feed speeds on the order of 800–1200 feet per minute.

The coextruded coating layer is applied at a melt temperature of 525–590 degrees F. The chill roller temperature and position is adjusted to achieve the finished results desired including gloss and freedom from curl. The chill roller temperatures control the rate of crystallization of the polyethylene or polypropylene which can have an effect on the physical properties of the final sheet. The fact that the subject substrate can withstand the application of an extrusion coated melt at the comparatively high temperature of 550 degrees F. is illustrative of its unique nature. Even though the reduced density substrate is very thin, it can be pulled under tension and the hot coating applied without any adverse effects.

Another significant advantage of using an extrusion coating process rather than a lamination process is the reduction in cost to the manufacture. It eliminates the need to buy and inventory more costly rolls of the clear biaxially oriented polypropylene from a film converting source. It eliminates the use of costly liquid adhesive as needed to apply the film by other lamination techniques. Some of such adhesives require a solvent for clean up after use in the laminating process. This difficult cleaning operation is eliminated. The extrusion coating operation can be done at significantly lower cost than the purchase of film in roll form. Problems with inventory control to have suitable widths for all label requirements are eliminated. Various width requirements can be easily handled by simple adjustment in the extrusion coating process. While an adhesive type material is also used in the extrusion coating process as described by use of a tie layer, the materials used are solid resin pellets easily automatically handled by equipment used by plastic converters. Adhesives used in lamination processes are all liquids supplied in containers or drums which require more difficult handling procedures. Such adhesive is also subject to freezing which renders it unusable. Heated warehouse storage is required which adds another source of cost. High waste is also typical with these adhesives as there is discard from the laminator at the termination of runs and there is usually residual left in the containers due to difficulty in getting all of the material out of these containers. The extrusion coating process simplifies the converter operation and reduces the manufactured cost of the product.

In the process of lamination, it is frequently possible to entrap air bubbles between the laminated plies or layers. These air pockets can occur due to the physical combining of the sheets, air entrapment in the adhesive due to its mechanical working in the process, and, in some cases, a degassing of the adhesive during its curing action. In the case where one layer is clear and applied over printed art, these air bubbles impair the appearance and degrade the quality of print appearance of the clear film layer. In extrusion coating the clear top layer is developed by applying a hot resin in liquid form to the surface and then cooling it to solidfy it over the printed surface. The mechanics involved of the hot resin liquid flowing onto the sheet minimize the chance for the entrapment of air. Therefore a clear extrusion coated film thusly developed, will allow the printed art to show through in crisp detail without this type impairment and have a high gloss appeal.

An example of the coextruded substrate (Sample 1 from Table I) after processing through printing and extrusion coating where a clear layer was applied consisting of 0.1 mils Quantum TR002 tie layer and 0.40 mils Montell PF 611 polypropylene is shown below:

TABLE III

| Property | Units | Value |
| --- | --- | --- |
| Composite Caliper | Mils | 2.5 |
| Solid Layer Caliper | Mils | 1.3 |
| Cellular Layer Caliper | Mils | 0.7 |
| Extrusion Coated Layer Caliper | Mils | 0.5 |
| Composite Density | PCF | 52.4 |
| Solid Layer Density | PCF | 67.6 |
| Cellular Layer Density | PCF | 19 |
| Tensile Yield | Lbs. | 5.9 |
| Tensile Break | Lbs. | 5.8 |
| Elongation | % | 56.4 |
| Mullen Burst Strength | PSI | 21.2 |
| Tear Strength | Lbs. | 6.2 |
| MD Stiffness | Mgs. | 8.4 |
| CD Stiffness | Mgs. | 4.6 |

The data shows favorable improvements in elongation, Mullen burst strength, and tear strength. The prime advantage of the label laminated by extrusion coating is protection from abrasion of the printed surface and the enhancement in appearance of the print by added gloss and clarity of print detail.

Although the addition of a surface layer to the substrate by extrusion coating has been described by simultaneously coextruding a tie layer and a surface layer, the tie layer could be applied first followed by extruding the surface layer. In addition, the tie layer could be applied by roll application rather than extrusion. Also, the tie layer could be a material which has adhesive properties.

Figure 7:
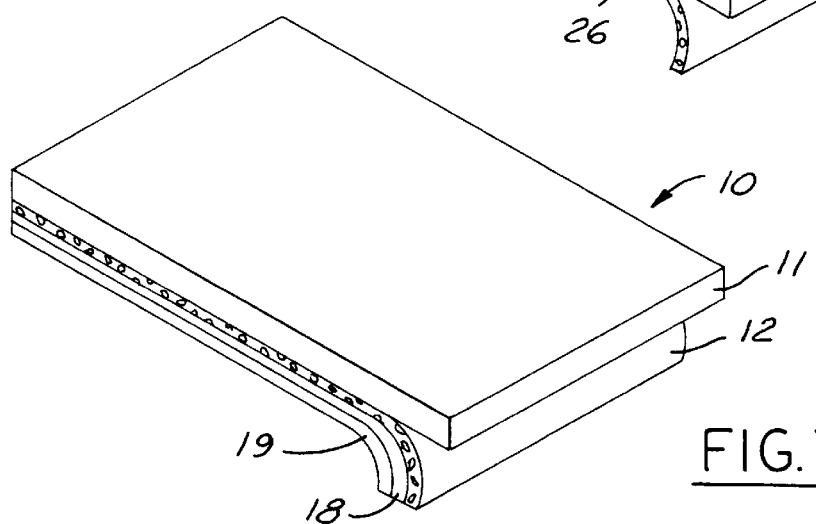
FIG. 7 is a diagrammatic view of another form of label for pressure sensitive use.

In the form of the label material shown in FIG. 7, a label material comprising a substrate 10 consisting of a thin unfoamed layer 11 and a thin foam layer 12 is provided with a pressure sensitive layer 18 and a carrier 19 such as paper or plastic which is removable to provide a pressure sensitive label. The method is shown diagrammatically in FIG. 8 which shows a supply roll 50 of substrate that is drawn past a pressure sensitive adhesive applicator 52 and an oven 54; then to a carrier web 19 from a carrier roll 56 to adhere the carrier; and then to a rewind roll 58 after passing through nip rolls 60, 62.

In conducting tensile tests, the samples having the thickness indicated were ½ inch in width and 2 inches between jaws. The Mullen burst test was a standard test. Tear strength tests comprised clamping a 2"×2" sample in a fixture having an gap exposing a portion of the sample and applying a tear force at 90 degrees to the sample on the exposed portion of the sample by a strap attached to the fixture at one end and an Instron instrument at the other end. The stiffness tests were standard tests.

It can thus be seen that there has been provided a plastic substrate which can be used as a label material or as a substrate by laminating another unfoamed plastic layer thereon by adhesive or by extrusion coating; wherein the presence of gauge bands is minimized; wherein the label material can be wound in rolls that can be readily handled without the adverse effects of gauge bands due to the unfoamed plastic layer or due to ink printing thereon; wherein the labels have a thin layer of foam material which provides cells that define an irregular surface which is receptive to adhesive for adhering the label to a container such as a glass bottle, plastic bottle or can; wherein a minimal amount of adhesive is required to adhere the label; wherein if the label is not applied correctly, the label can be readily removed from the container and a minimal portion of the label is left on the container such that the container can be re-labeled; wherein when the container with the label is recycled, the density of the label is below that of water such that the label can be readily reclaimed separate from the container; wherein the label has greater stiffness than a thin unfoamed layer; and wherein when the label material is to be used as a pressure sensitive layer and is applied to a carrier web for handling, the label and carrier web provide sufficient insulation to withstand the heat of laser printing as is sometimes used in the field as, for example in labeling pressure sensitive labels used on store shelves.

What is claimed is:

1. A label material for use in wrapping hollow plastic containers comprising
    a coextruded substrate consisting essentially of a thick styrenic unfoamed plastic layer and a thin styrenic foam layer, said unfoamed plastic layer comprising the predominant portion of said label material as contrasted to the thin foam layer, said unfoamed layer comprising 75–85% by weight and said thin foam layer comprising 15–25% by weight, said total thickness of said coextruded substrate ranges between about 1.5 mils and about 3.0 mils, said coextruded substrate having a density range of about 48 to 52 PCF, said unfoamed layer having a density range of about 66.5 to 68.0 PCF and said foamed layer having a density range of about 18 to 22 PCF, such that the substrate is able to elongate when wrapped about a plastic container to accommodate a change in diameter of the plastic container when the plastic container is filled with a cold carbonated beverage and the beverage warms to room temperature or above causing the plastic container diameter to increase; and is resistant to chipping and tearing when used on plastic containers during packaging and handling of the plastic containers at high speeds and the thin foam layer functions as a cushioning layer when the substrate is wound in a roll thereby minimizing web distortions which would result in gauge bands.

2. The label material set forth in claim 1 wherein said thick styrenic unfoamed layer has a thickness ranging between about 1.25 mils to about 2.50 mils and the styrenic foam layer has a thickness ranging between about 0.25 mils and about 1.0 mils.

3. The label material set forth in claim 1 wherein said thick styrenic unfoamed layer has a thickness ranges between about 1.25 mils and about 1.30 mils and the styrenic foam layer has a thickness between about 0.5 mils and about 1.0 mils.

4. The label material set forth in claim 1 wherein said styrenic unfoamed layer and styrenic foam layer comprise polystyrene.

5. The label material set forth in claim 4 wherein said styrenic foam layer comprises a blend of medium impact polystyrene, polypropylene and a compatibility agent.

6. The label material set forth in claim 5 wherein said styrenic foam layer has been made by utilizing carbon dioxide as a blowing agent.

7. The label material set forth in claim 6 wherein said foam layer has a density ranging between about 20 and about 24 lbs/ft$^3$.

8. The label material set forth in claim 4 wherein said label material is shrinkable in a machine direction.

9. The label material set forth in claim 1 including printing on said unfoamed layer.

10. The label material set forth in any one of claim 1–8 including an additional unfoamed layer of clear or translucent plastic material bonded to said styrenic unfoamed layer of said coextruded substrate.

11. The label material set forth in claim 10 wherein said additional unfoamed layer is laminated by an adhesive.

12. The label material set forth in claim 11 wherein said additional unfoamed layer comprises polyolefin.

13. The label material set forth in claim 11 wherein said additional unfoamed layer is polypropylene or polyethylene.

14. The label material set forth in claim 13 wherein said adhesive is polyurethane.

15. The label material set forth in claim 10 wherein said additional unfoamed layer is extrusion coated on said coextruded substrate.

16. The label material set forth in claim 15 wherein said additional unfoamed layer material comprises polyolefin.

17. The label material set forth in claim 15 wherein said additional unfoamed layer comprises polypropylene or polyethylene.

18. The label material set forth in claim 15 including a tie layer between said additional unfoamed layer and said coextruded substrate.

19. The label material set forth in claim 18 wherein said tie layer is coextruded with said additional layer onto said coextruded substrate.

20. The label material set forth in claim 18 wherein said tie layer is first applied to said coextruded substrate and then the additional layer is coextruded on said tie layer.

21. The label material set forth in claim 18 wherein said tie layer comprises a material selected from the group consisting of ethylene acrylic acid, ethylene ethyl acrylate, ethylene methyl acrylate and ethylene vinyl acetate.

22. The label material set forth in claim 15 wherein said additional unfoamed layer comprises polyolefin.

23. The label material set forth in claim 15 wherein said additional unfoamed layer comprises polypropylene or polyethylene.

24. The label material set forth in claim 23 wherein said additional layer ranges in thickness between about 0.3 mils and about 0.4 mils.

25. The label material set forth in claim 18 wherein said tie layer ranges in thickness between about 0.1 mils and about 0.2 mils.

26. The label material set forth in claim 18 wherein said additional unfoamed layer and tie layer are coextruded by extrusion coating on said unfoamed layer of said substrate.

27. The label material set forth in claim 10 wherein said additional layer is printed on the surface adjacent the foamed layer.

28. The label material set forth in claim 10 including a carrier and a layer of pressure sensitive adhesive between said carrier and said thin foamed layer.

29. A package comprising:
a hollow plastic container;
a coextruded label substrate wrapped about said container;
a coextruded substrate consisting essentially of a thick styrenic unfoamed plastic layer and a thin styrenic foam layer, said unfoamed plastic layer comprising the predominant portion of said label material as contrasted to the thin foam layer, said unfoamed layer comprising 75–85% by weight and said thin foam layer comprising 15–25% by weight, said total thickness of said coextruded substrate ranges between about 1.5 mils and about 3.0 mils, said coextruded substrate having a density range of about 48 to 52 PCF, said unfoamed layer having a density range of about 66.5 to 68.0 PCF and said foamed layer having a density range of about 18 to 22 PCF,
said label having ends bonded to one another, such that said label is able to elongate when wrapped about a plastic container to accommodate a change in diameter of the plastic container when the plastic container is filled with a cold carbonated beverage and the beverage warms to room temperature or above causing the plastic container diameter to increase; and is resistant to chipping and tearing when used on plastic containers during packaging and handling of the plastic containers at high speeds and the thin foam layer functions as a cushioning layer when the substrate is wound in a roll thereby minimizing web distortions which would result in gauge bands.

30. The package set forth in claim 29 wherein said thick styrenic unfoamed layer has a thickness ranging between about 1.25 mils to about 2.50 mils and the thin styrenic foam layer has a thickness ranging between about 0.25 mils and about 1.0 mils.

31. The package set forth in claim 29 wherein said thick styrenic unfoamed layer has a thickness ranging between about 1.25 mils and about 1.30 mils and the styrenic foam layer has a thickness between about 0.5 mils and about 1.0 mils.

32. The package set forth in claim 29 wherein said unfoamed layer and foam layer comprise polystyrene.

33. The package set forth in claim 32 including an unfoamed layer of clear or translucent plastic material bonded to said unfoamed layer.

34. The package set forth in claim 33 wherein said unfoamed layer of clear or translucent plastic material comprises biaxially oriented polypropylene.

35. The package set forth in claim 34 wherein said foam layer comprises a blend of medium impact polystyrene, polypropylene and a compatability agent.

36. The package set forth in claim 29 wherein said unfoamed layer of clear or translucent plastic material comprises polystyrene.

37. The package set forth in claim 36 wherein said unfoamed layer of clear or translucent plastic material comprises biaxially oriented polystyrene such that said label is shrinkable.

38. The package set forth in claim 32 wherein said foam layer has been made by utilizing carbon dioxide as a blowing agent.

39. The package set forth in claim 29 including printing on said unfoamed layer.

40. The package set forth in any one of claims 29–37 including an unfoamed layer of clear or translucent plastic material bonded to said styrenic unfoamed layer of said coextruded substrate.

41. The package set forth in claim 40 wherein said additional unfoamed layer is bonded by an adhesive.

42. The package set forth in claim 41 wherein said additional unfoamed layer comprises polyolefin.

43. The package set forth in claim 41 wherein said additional unfoamed layer is polypropylene or polyethylene.

44. The package set forth in claim 41 wherein said adhesive is polyurethane.

45. The package set forth in claim 40 wherein said additional unfoamed layer is extrusion coated on said coextruded substrate.

46. The package set forth in claim 45 wherein said additional unfoamed layer material comprises polyolefin.

47. The package set forth in claim 45 wherein said additional unfoamed layer comprises polypropylene or polyethylene.

48. The package set forth in claim 45 including a tie layer between said additional unfoamed layer and said coextruded substrate.

49. The package set forth in claim 45 wherein said tie layer is coextruded with said additional layer onto said coextruded substrate.

50. The package set forth in claim 48 wherein said tie layer is first applied to said coextruded substrate and then the additional layer is coextruded on said tie layer.

51. The package set forth in claim 48 wherein said tie layer comprises a material selected from the group consisting of ethylene acrylic acid, ethylene ethyl acrylate, ethylene methyl acrylate and ethylene vinyl acetate.

52. The package set forth in claim 45 wherein said additional unfoamed layer comprises polyolefin.

53. The package set forth in claim 52 wherein said additional layer ranges in thickness between about 0.3 mils and about 0.4 mils.

54. The package set forth in claim 48 wherein said tie layer ranges in thickness between about 0.1 mils and about 0.2 mils.

55. The package set forth in claim 48 wherein said additional unfoamed layer and tie layer are coextruded by extrusion coating on said unfoamed layer of said coextruded substrate.

56. The package set forth in claim 40 including a carrier and layer of pressure sensitive adhesive between said carrier and said thin foamed layer.

57. A method of making label material for use in wrapping hollow plastic containers comprising:

coextruding a substrate comprising a thick styrenic unfoamed plastic layer and a thin styrenic foam layer, said coextruded substrate having a density range of about 48 to 52 PCF, said unfoamed layer having a density range of about 66.5 to 68.0 PCF and said thin foamed layer having a density range of about 18 to 22 PCF;

controlling the weight of said layers such that said unfoamed layer comprises 75–85% by weight and said thin foam layer comprises 15–25% by weight;

controlling the thickness of said layers such that said total thickness of said coextruded sheet ranging between about 1.5 mils and about 3.0 mils, such that said substrate is able to elongate when wrapped about a plastic container to accommodate a change in diameter of the plastic container when the plastic container is filled with a cold carbonated beverage and the beverage warms to room temperature or above causing the plastic container diameter to increase; and is resistant to chipping and tearing when used on plastic containers during packaging and handling of the plastic containers at high speeds and the thin foam layer functions as a cushioning layer when the substrate is wound in a roll thereby minimizing web distortions which would result in gauge bands.

58. The method set forth in claim 57 including the step of controlling the thicknesses of said layers such that said thick unfoamed layer has a thickness ranging between about 1.25 mils to about 2.50 mils and the foam layer has a thickness ranging between about 0.25 mils and about 1.0 mils.

59. The method set forth in claim 57 including the step of controlling the thickness of said layers such that said thick unfoamed layer has a thickness ranges between about 1.25 mils and about 1.30 mils and the foam layer has a thickness between about 0.5 mils and about 1.0 mils.

60. The method set forth in claim 57 wherein said step of coextruding comprises coextruding said styrenic unfoamed layer and styrenic foam layer from polystyrene.

61. The method set forth in claim 60 wherein said step of coextruding comprises coextruding said styrenic foam layer from a blend of medium impact polystyrene, polypropylene and a compatibility agent.

62. The method set forth in claim 61 wherein said step of coextruding comprises coextruding said foam layer utilizing carbon dioxide as a blowing agent.

63. The method set forth in claim 62 including the step of printing on said unfoamed layer.

64. The method set forth in any one of claims 57–63 including the step of bonding a clear or translucent unfoamed layer of plastic material to said unfoamed layer of said coextruded substrate.

65. The method set forth in claim 64 wherein said step of bonding said additional layer is by using an adhesive.

66. The method set forth in claim 65 wherein said additional unfoamed layer comprises polyolefin.

67. The method set forth in claim 65 wherein said additional unfoamed layer is polypropylene or polyethylene.

68. The method set forth in claim 57 wherein said adhesive is polyurethane.

69. The method set forth in claim 64 including extrusion coating said additional unfoamed layer on said coextruded substrate.

70. The method set forth in claim 65 wherein said additional unfoamed layer material comprises polyolefin.

71. The method set forth in claim 69 wherein said additional unfoamed layer comprises polypropylene or polyethylene.

72. The method set forth in claim 69 including providing a tie layer between said additional unfoamed layer and said coextruded substrate.

73. The method set forth in claim 72 including coextruding said tie layer and said additional layer onto said coextruded substrate.

74. The method set forth in claim 72 including first applying said tie layer to said coextruded substrate and then extrusion coating said additional layer on said tie layer.

75. The method set forth in claim 72 wherein said tie layer comprises a material selected from the group consisting of ethylene acrylic acid, ethylene ethyl acrylate, ethylene methyl acrylate and ethylene vinyl acetate.

76. The method set forth in claim 64 wherein said additional unfoamed layer comprises polyolefin.

77. The method set forth in claim 64 wherein said step of adding said additional unfoamed layer comprises selecting polypropylene or polyethylene.

78. The method set forth in claim 69 wherein said additional layer comprises controlling thickness of said additional layer such that it ranges in thickness between about 0.3 mils and about 0.4 mils.

79. The method set forth in claim 69 wherein said tie layer ranges in thickness between about 0.1 mils and about 0.2 mils.

80. The method set forth in claim 69 wherein said additional unfoamed layer and tie layer are coextruded by extrusion coating on said unfoamed layer of said substrate.

81. The method set forth in claim 64 including the step of printing one of said unfoamed layer or said additional layer on the surface adjacent the other.

82. The method set forth in claim 69 including the step of bonding a carrier to said thin foamed layer.

83. The method set forth in claim 82 wherein said step of bonding comprises interposing a pressure sensitive layer between said carrier and said unfoamed layer.

* * * * *